United States Patent
Leitao et al.

(10) Patent No.: US 11,126,459 B2
(45) Date of Patent: Sep. 21, 2021

(54) FILESYSTEM USING HARDWARE TRANSACTIONAL MEMORY ON NON-VOLATILE DUAL IN-LINE MEMORY MODULE

(71) Applicant: International Business Machines Corporation, Armonk, NY (US)

(72) Inventors: Breno H. Leitao, Araraquara (BR); Juscelino Candido De Lima Junior, Campinas (BR); Camilla da Graca Portes Ogurtsova, Campinas (BR); Alexander Aguina, Campinas (BR)

(73) Assignee: International Business Machines Corporation, Armonk, NY (US)

( * ) Notice: Subject to any disclaimer, the term of this patent is extended or adjusted under 35 U.S.C. 154(b) by 413 days.

(21) Appl. No.: 16/162,514

(22) Filed: Oct. 17, 2018

(65) Prior Publication Data
US 2020/0125392 A1    Apr. 23, 2020

(51) Int. Cl.
*G06F 9/46* (2006.01)
*G06F 3/06* (2006.01)
*G06F 16/176* (2019.01)
*G06F 16/18* (2019.01)

(52) U.S. Cl.
CPC ............ *G06F 9/467* (2013.01); *G06F 3/0619* (2013.01); *G06F 3/0659* (2013.01); *G06F 3/0679* (2013.01); *G06F 16/1774* (2019.01); *G06F 16/1865* (2019.01)

(58) Field of Classification Search
CPC ... G06F 9/467; G06F 16/1774; G06F 16/1865
See application file for complete search history.

(56) References Cited

U.S. PATENT DOCUMENTS

| | | |
|---|---|---|
| 9,262,173 B2 | 2/2016 | Akkary |
| 9,348,705 B1 | 5/2016 | Wu |
| 9,477,481 B2 | 10/2016 | Gschwind |

(Continued)

OTHER PUBLICATIONS

"Hardware Lock Elision Overview", Intel® C++ Compiler 17.0 Developer Guide and Reference, Submitted Oct. 24 2016, 4 pages, <https://software.intel.com/en-us/node/683688>.

(Continued)

*Primary Examiner* — Loc Tran
(74) *Attorney, Agent, or Firm* — Mark Bergner

(57) ABSTRACT

A computer-implemented method comprises receiving a request to write to a file and, in response to the request, determining that the file exists in a storage device. In response to the determination that the file exists, the method further comprises mapping the file into a region of a non-volatile dual in-line memory module (NVDIMM); initiating a transaction to write to the mapped file in the NVDIMM without acquiring a speculative lock on the mapped file; and determining whether a conflict occurred in writing to the mapped file in the NVDIMM. In response to a determination that a conflict occurred, the method comprises restarting the transaction to write to the mapped file in the NVDIMM without acquiring the speculative lock on the mapped file. In response to a determination that no conflict occurred, the method comprises committing changes made to the mapped file to the file in the storage device.

17 Claims, 4 Drawing Sheets

(56) References Cited

U.S. PATENT DOCUMENTS

| | | | |
|---|---|---|---|
| 9,524,195 B2* | 12/2016 | Gschwind | G06F 11/1441 |
| 9,619,281 B2 | 4/2017 | Dice | |
| 9,652,168 B2 | 5/2017 | Bhattacharjee | |
| 2014/0237205 A1 | 8/2014 | Takefman | |
| 2019/0324868 A1* | 10/2019 | Shivanna | G06F 11/1451 |

OTHER PUBLICATIONS

Bansal, et al., "Transactional memory analysis using CSB+ trees", AICTC '16 Proceedings of the International Conference on Advances in Information Communication Technology & Computing, Article No. 1, Aug. 12-13, 2016, 4 pages.

Bergner, et al., "Performance Optimization and Tuning Techniques for IBM Power Systems Processors Including IBM Power8", IBM Redbooks, Second Edition (Aug. 2015), 274 pages, <http://www.redbooks.ibm.com/redbooks/pdfs/sg248171.pdf>.

Dice, et a., "Refined Transactional Lock Elision", PPoPP '16 Proceedings of the 21st ACM SIGPLAN Symposium on Principles and Practice of Parallel Programming, Article No. 19, Mar. 12-16, 2016, 12 pages.

Evans, Chris, "Write-through, write-around, write-back: cache explained", last published in Apr. 2014, 4 pages, <https://www.computerweekly.com/feature/Write-through-write-around-write-back-Cache-explained>.

Rudoff, Andy, "Persistent Memory Programming", login: Summer 2017 vol. 42, No. 2, pp. 34-40, <https://www.usenix.org/system/files/login/articles/login_summer17_07_rudoff.pdf>.

\* cited by examiner

FILESYSTEM USING HARDWARE TRANSACTIONAL MEMORY ON NON-VOLATILE DUAL IN-LINE MEMORY MODULE

BACKGROUND

A thread of execution (also referred to herein simply as a 'thread') is the smallest sequence of programmed instructions that can be managed independently by a scheduler. The scheduler is typically a part of an operating system executed by a central processing unit (CPU). A thread is typically referred to as a component of a process, and a single process can include a plurality of threads that execute concurrently and share resources, such as memory.

SUMMARY

Aspects of the disclosure may include a computer implemented method, computer program product, and system for processing and scheduling new calendar events. The computer-implemented method comprises receiving a request to write to a file and, in response to the request, determining that the file exists in a storage device. In response to the determination that the file exists, the method further comprises mapping the file into a region of a non-volatile dual in-line memory module (NVDIMM); initiating a transaction to write to the mapped file in the NVDIMM without acquiring a speculative lock on the mapped file; and determining whether a conflict occurred in writing to the mapped file in the NVDIMM. In response to a determination that a conflict occurred, the method comprises restarting the transaction to write to the mapped file in the NVDIMM without acquiring the speculative lock on the mapped file. In response to a determination that no conflict occurred, the method comprises committing changes made to the mapped file to the file in the storage device.

The above summary is not intended to describe each illustrated embodiment or every implementation of the present disclosure.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
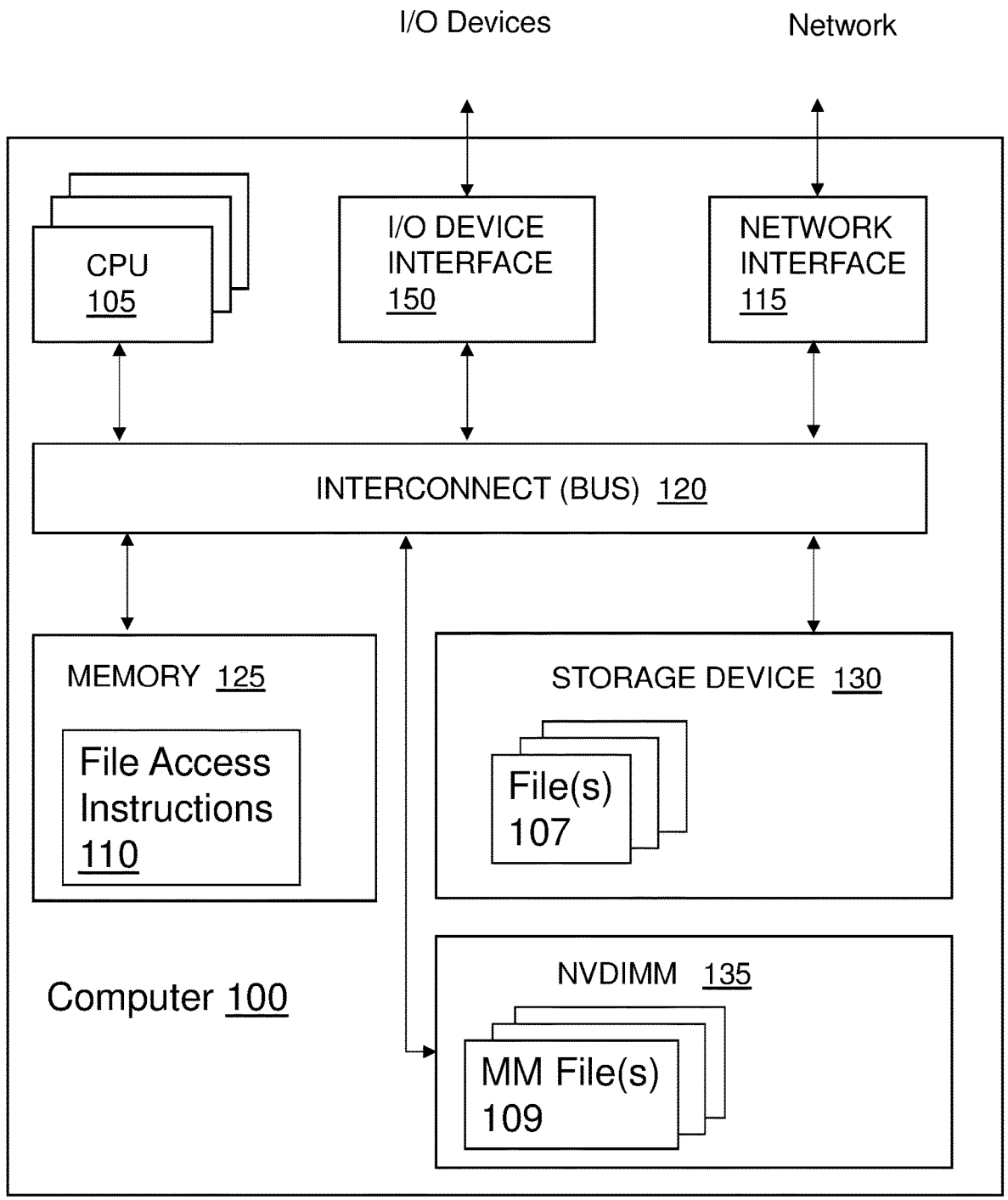
FIG. 1 is a block diagram of one embodiment of an example computer system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual acts may be performed. The following detailed description is, therefore, not to be taken in a limiting sense.

As used herein, the phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C", and "A, B, and/or C" means A alone, B alone, C alone, A and B together, A and C together, B and C together, or A, B, and C together. Additionally, the term "a" or "an" entity refers to one or more of that entity. As such, the terms "a" (or "an"), "one or more", and "at least one" can be used interchangeably herein. It is also to be noted that the terms "comprising," "including", and "having" can be used interchangeably. The term "automatic" and variations thereof, as used herein, refers to any process or operation done without material human input when the process or operation is performed. Human input is deemed to be material if such input directs or controls how or when the process or operation is performed. A process which uses human input is still deemed automatic if the input does not direct or control how or when the process is executed.

The terms "determine", "calculate", and "compute", and variations thereof, as used herein, are used interchangeably and include any type of methodology, process, mathematical operation, or technique performed by a computer processor. Hereinafter, "in communication" or "communicatively coupled" shall mean any electrical connection, whether wireless or wired, that allows two or more systems, components, modules, devices, etc. to exchange data, signals, or other information using any protocol or format. Furthermore, two components that are communicatively coupled need not be directly coupled to one another, but can also be coupled together via other intermediate components or devices.

FIG. 1 is a block diagram of one embodiment of an example computer system 100. The computer system 100 can be implemented as a desktop computer, portable computer, laptop or notebook computer, netbook, tablet computer, pocket computer, smart phone, or any other suitable type of electronic device. In the example shown in FIG. 1, the computer system 100 includes a memory 125, storage device 130, non-volatile dual in-line memory module (NVDIMM) 135, an interconnect (e.g., BUS) 120, one or more processors 105 (also referred to as CPUs 105 herein), an I/O device interface 150, and a network interface 115.

Each CPU 105 retrieves and executes programming instructions stored in the memory 125 and/or storage device 130. The interconnect 120 is used to move data, such as programming instructions, between the CPU 105, I/O device interface 150, storage device 130, network interface 115, memory 125, and NVDIMM 135. The interconnect 120 can be implemented using one or more busses. The CPUs 105 can be a single CPU, multiple CPUs, or a single CPU having multiple processing cores in various embodiments. In some embodiments, a processor 105 can be a digital signal processor (DSP). Memory 125 is generally included to be representative of a random access memory (e.g., static random access memory (SRAM), dynamic random access memory (DRAM)). The storage 130 is generally included to be representative of a non-volatile memory, such as a hard disk drive, solid state device (SSD), removable memory cards, optical storage, or flash memory devices. In an alternative embodiment, the storage 130 can be replaced by storage area-network (SAN) devices, the cloud, or other devices connected to the computer system 100 via the I/O device interface 150 or via a communication network coupled to the network interface 115.

The NVDIMM 135 is generally representative of a non-volatile random-access memory which is configured to retain contents stored in the NVDIMM 135 even when electrical power is removed from either an unexpected power loss, system crash, or normal shutdown. NVDIMM 135 can be implemented in different ways in various embodiments. For example, NVDIMM 135 can be implemented according to the NVDIMM-F, NVDIMM-N, or NVDIMM-P standards maintained by the Joint Electron Device Engineering Council (JEDEC) Solid State Technology Association, in some embodiments. In other embodiments, NVDIMM 135 can be implemented using a variation of one of the above standards or using a non-standard implementation, such as NVDIMM-X. One example implementation of NVDIMM 135 is described in more detail below with respect to FIG. 2.

In the example shown in FIG. 1, the computer system 100 includes both memory 125 and NVDIMM 135. However, in other embodiments, the computer system does not include memory 125 and utilizes only NVDIMM 135 as random-access memory in the computer system 100. Furthermore, it is to be understood that memory 125 and/or NVIDMM 135 can each be comprised of a plurality of modules.

In the example shown in FIG. 1, the memory 125 stores file access instructions 110 and the storage 130 stores user files 107. However, in various embodiments, the file access instructions 110 can be stored partially in memory 125 and partially in NVDIMM 135, or entirely in memory 125 or entirely in NVDIMM 135 for processing by CPU 105.

The file access instructions 110 are executed by the CPU 105. Although only file access instructions 110 are shown in FIG. 1, it is to be understood that other instructions can be stored in memory 125 and/or NVDIMM 135 for execution by CPU 105, such as, but not limited to instructions for executing an operating system. For example, file access instructions 110 can be a part of operating system instructions executed by CPU 105, in some embodiments. In some such embodiments, for example, file access instructions 110 are implemented as part of the kernel libraries of a Linux® distribution operating system. However, it is to be understood that other embodiments can be implemented differently and/or in other operating systems. Linux is the registered trademark of Linus Torvalds in the U.S. and other countries.

In executing instructions, CPU 105 can output signals and commands to a device communicatively coupled with the computer system 100 via network 115 or I/O device interface 150. For example, the output signals and commands can cause the device to provide a visual and/or audio prompt to request input from a user utilizing the computer system 100. Thus, the device communicatively coupled to the computer system 100 can include user interface devices such as a display screen, speakers, keyboard, mouse, keypad, touchpad, trackball, buttons, light pen, or other pointing devices. Thus, it is to be understood that the user interface devices can be devices external to a physical housing of the computer system (such as, but not limited to, a keyboard or mouse communicatively coupled to a laptop or desktop computer, etc.) and/or devices integrated into a housing of the computer system 100 (such as, but not limited to, a touchscreen of a smart phone, a keyboard of a laptop computer, etc.).

As understood by one of skill in the art, in performing various functions by executing instructions stored in memory 125 and/or NVDIMM 135, the CPU 105 executes a plurality of threads. In order to avoid conflicts between threads concurrently accessing the same file, conventional systems typically use some form of locking protocol, such as a mutex lock or spin-lock, to guarantee that threads have exclusive access to shared data, such as for a critical section of code execution. For example, generally-speaking, a spin-lock (also referred to as a spinlock) is a lock which causes a thread trying to acquire it to wait in a loop or spin until the lock becomes available. Specific implementations of a spin-lock in software depend on capabilities of the underlying hardware. Typically, a thread acquires the lock, executes its critical section of code, and releases the lock. This approach is considered a pessimistic concurrency control approach.

Alternatively, another approach to concurrency control in the context of multi-threaded, multi-core hardware processors is the use of a "hardware transactional memory." Hardware transactional memory (HTM) attempts to simplify concurrent programming by allowing a group of load and store instructions to execute in an atomic way (i.e., guarantee of isolation from concurrent processes). A transaction is a collection or group of load and store instructions that can execute and commit changes as long as a conflict is not present. When a conflict is detected, a transaction will revert to its initial state (prior to any changes) and will rerun until all conflicts are removed. This approach is considered an optimistic concurrency control approach.

HTM provides access to shared resources with transactional properties. Exemplary implementations of HTM include IBM® Blue Gene® supercomputers, IBM® Z® mainframe computers, IBM® Power® processors and Intel® Transactional Synchronization Extensions (TSX). IBM, Blue Gene, Z, and Power are trademarks of International Business Machines Corporation, registered in many jurisdictions worldwide. Intel is a registered trademark of Intel Corporation in the United States and other countries.

HTM is based on optimistic concurrency control in which transactions access the shared resources (read/write) without appearing to acquire a lock on the shared resource to other processes. Therefore, HTM is responsible for detecting conflicts among concurrent readers and writers of shared resources and abort affected transactions. The aborted transaction reattempts a number of times by re-executing the transaction including re-reading/re-writing of shared resources. Each transaction typically has a fallback routine that is based on a traditional software locking mechanism once a predetermined number of reattempts has been reached. Consequently, a transaction will automatically switch from hardware transactional memory to software locking method after trying a predetermined number of reattempts. This technique is called "lock elision" or "speculative lock elision". Through lock elision, a thread executes a lock-protected region speculatively as a transaction, and only falls back to blocking on the lock if the transaction does not commit.

For example, in some Intel® processors, there is a feature called Hardware Lock Elision (HLE). Through HLE, multiple threads executing critical sections protected by the same lock can execute concurrently if they do not perform conflicting data operations. Even though the software uses lock acquisition operations on a common lock, the hardware is configured to elide the lock and execute the critical sections on the multiple threads without requiring communication through the lock if no conflicts are detected. If the processor is unable to execute the region transactionally, it will execute the region non-transactionally and without elision. That is, the processor will use a non-HLE lock-based execution.

Although HTM and lock elision can provide performance benefits over conventional locking protocols by avoiding unnecessary use of locks, the speculative lock elision still involves additional overhead related to locks and lock files. The embodiments described herein enable a mixed usage of Hardware Transactional Memory and NVDIMM 135 to avoid the need to use traditional locks and lock elision while providing corruption-less access to files which provides further performance improvements for computer system 100 by reducing overhead needed for lock elision.

In particular, computer system 100 enables usage of HTM with memory mapped files 109 on NVDIMM 135. The files 107 are memory mapped to a region of the NVDIMM 135 as memory mapped files 109 (also referred to as MMapped files 109). The memory mapped file system on NVDIMM 135 creates a write-back memory that keeps the disk status of storage device 130 and is non-volatile. For example, as understood by one of skill in the art, there is often a trade-off between using write-back mode or write-through mode. Generally speaking, write-through mode has the benefit of maintaining an up-to-date copy of the data in the primary file and, thus, is less susceptible to data loss events than write-back mode. In contrast, write-back mode typically has better performance in terms of speed and resources used. Through the use of memory mapped files on the NVDIMM 135, computer system 100 takes advantage of the performance benefits of write-back memory while also achieving the resilience and safety of write-through mode as the NVDIMM 135 is non-volatile. The use of HTM on top of the memory mapped file system on NVDIMM 135 also avoids traditional lock file creation and keeps the memory mapped file system consistent on the cache level/layer.

Furthermore, by using HTM on the NVDIMM 135, lock elision can be avoided because any changes done to MMapped files 109 will not be reflected or committed to the files 107 since MMapped files 109 are located in NVDIMM and are mapped files of the files 107. Thus, the overhead of obtaining speculative locks can be avoided. This speeds up writes to files under low contention situations. Additionally, by mapping files 107 to NVDIMM 135, computer system 100 is able to allocate files bigger than the memory size of NVDIMM 135. That is, space for all of the files 107 does not need to be allocated on NVDIMM 135 at the same time. For example, when a file is to be accessed (e.g. read or write), the contents of the file are loaded into the NVDIMM 135. If memory pressure increases (e.g. the memory on NVDIMM 135 is getting full), older data that has not been used (e.g. no recent and/or frequent accesses) are removed to make room for other requested file data. At least initially, accessing the MMapped files 109 will be faster because only the files actually being accessed are loaded into memory by the kernel. Additionally, as files are mapped to NVDIMM 135, multiple processes can access data in a read only fashion from the same file. Thus, the MMapped files 109 allow those processes to share the same physical memory pages which saves memory. The memory map filesystem is also useful for inter-process communication. In particular, a file 107 can be mapped as read/write in the processes that need to communicate and then synchronization primitives can be used in the memory mapped region. A method for implementing HTM on the memory mapped filesystem on NVDIMM 135 is described in more detail below with respect to FIG. 3.

Figure 2:
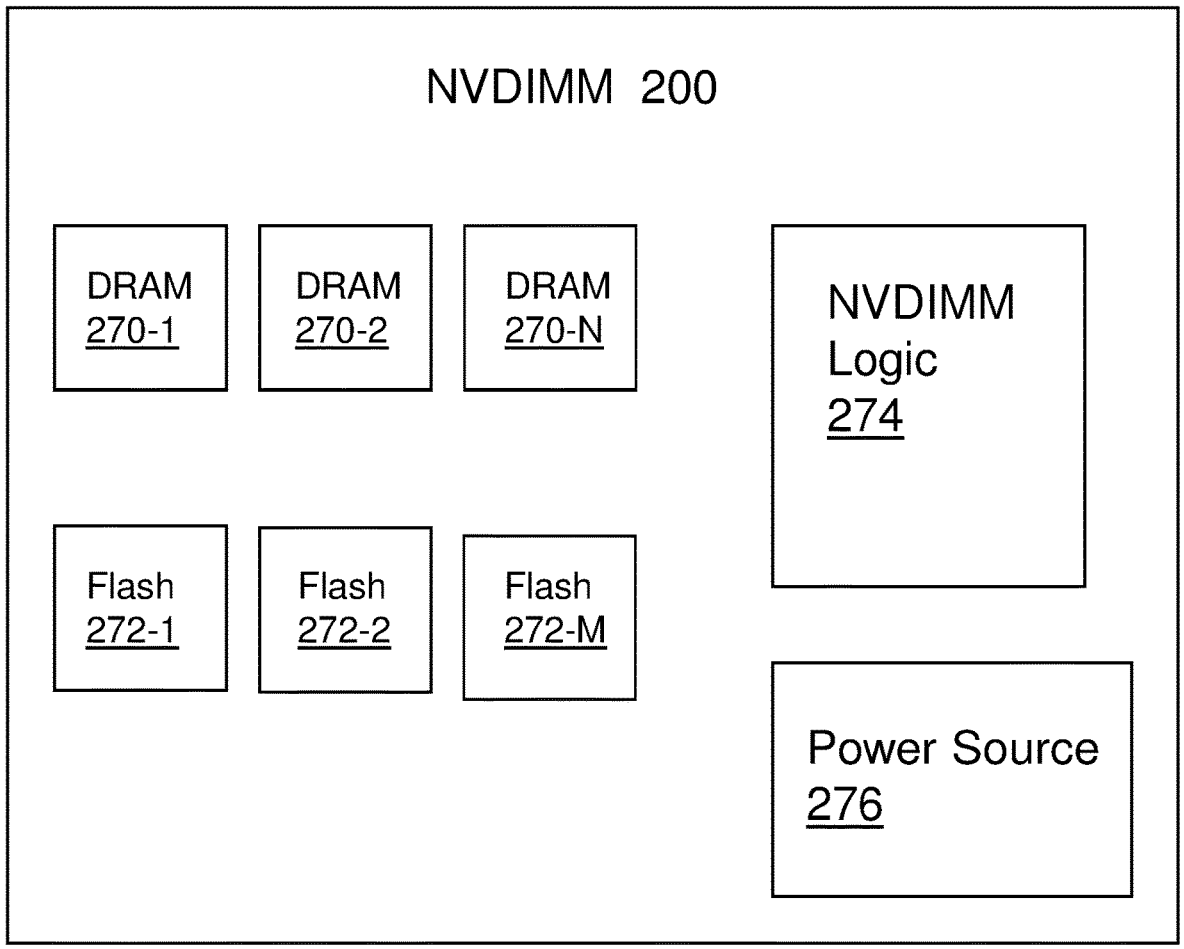
FIG. 2 is a block diagram of one embodiment of an example non-volatile dual in-line memory module.

FIG. 2 is a high-level block diagram depicting one embodiment of an NVDIMM 200 which can be implemented in an enhanced computer system, such as computer system 100. However, it is to be understood that NVDIMM 200 is presented by way of example only and that other embodiments can implement NVDIMM differently.

NVDIMM 200 includes a plurality of Dynamic Random-Access Memory (DRAM) circuits 270-1 ... 270-N (referred to collectively as DRAM circuits 270). DRAM circuits 270 are volatile memory modules and can be implemented in different ways, such as, but not limited to, Asynchronous DRAM, Single data rate synchronous DRAM, Double data rate synchronous DRAM, Direct Rambus DRAM, and Reduced Latency DRAM. DRAM technologies are known to one of skill in the art and not described in more detail herein.

When files, such as files 107 in FIG. 1, are mapped to MMapped files, such as MMapped files 109, the MMapped files are stored in one or more of the DRAM circuits 270. In the event of expected or unexpected power loss, NVDIMM logic 274 coordinates copying the data from DRAM circuits 270 to one or more of Flash memory circuits 272-1 ... 272-M (referred to collectively as Flash memory circuits 272). Flash memory is a non-volatile memory. The Flash memory circuits 272 can be implanted using any suitable known Flash technology, such as, but not limited to NOR Flash, NAND Flash, and vertical NAND Flash technologies. Flash memory technology is known to one of skill in the art and not discussed in more detail herein.

When electrical power is removed, in order to prevent data loss before copying the data to Flash memory circuits 272, NVDIMM 200 uses power from onboard power source 276. The power source 276 can be implemented, for example, with a supercapacitor, as known to one of skill in the art. Furthermore, the power source 276 can be integrated onto the same printed circuit board as the Flash memory circuits 272, NVDIMM logic 274 and DRAM circuits 270 in some embodiments. In other embodiments, the power source is not integrated onto the same printed circuit board and electrically connected to NVDIMM logic 274, DRAM circuits 270, and Flash memory circuits 272.

Figure 3:
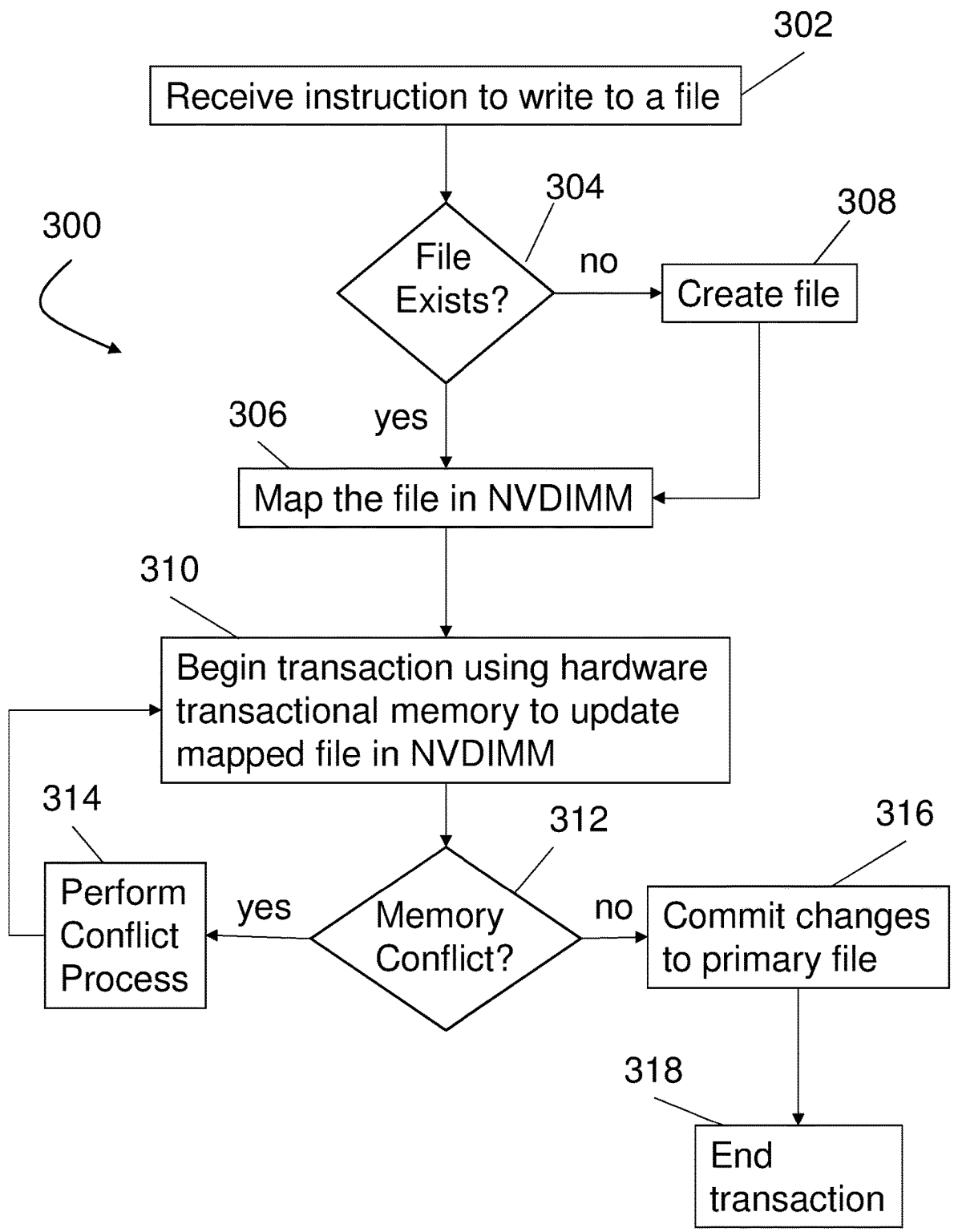
FIG. 3 is a flow chart depicting one embodiment of an example method for implementing hardware transactional memory on a memory mapped file system on an NVDIMM.

FIG. 3 depicts one embodiment of an example method 300 for implementing HTM on a memory mapped filesystem on NVDIMM. Method 300 can be implemented by a processor executing instructions such as CPU 105 executing file access instructions 110 discussed above. It is to be understood that the order of actions in example method 300 is provided for purposes of explanation and that the method 300 can be performed in a different order in other embodiments. Similarly, it is to be understood that some actions can be omitted or additional actions can be included in other embodiments.

At block 302, an instruction/request is received to write to a file. The instruction can be the result of received user input or the result of executing other instructions. At block 304, the processor (also referred to herein as a processing unit or central processing unit) determines if the file exists. In particular, the processor determines if the file exists in the primary memory (e.g. a storage device, such as storage device 130). As used herein, primary memory refers to segments of a non-volatile storage device not used as virtual memory. If the file exists, the processor performs a memory map operation at block 306 to map the file to a region of a NVDIMM, such as NVDIMM 135 or NVDIMM 200.

Memory mapping includes creating a virtual memory space on the NVDIMM and assigning a direct byte-for-byte correlation with the file stored in the physical storage device. The correlation permits threads to treat the mapped file as if it were the primary memory. In some embodiments, the processor maps the files into an area of the NVDIMM called virtual dynamic shared object (vDSO). As known to one of skill in the art, vDSO is a shared library that allows an application running in user space to perform some kernel actions without as much overhead as a system call. If the processor determined that the file does not exist in the primary memory, the processor creates the file in the primary memory at block 308 and then maps the file into the virtual memory on the NVDIMM at block 306.

At block 310, a transaction is begun using hardware transactional memory to update the memory mapped file on the NVDIMM without acquiring a speculative lock on the mapped file. The update to the memory mapped file can be implemented using load and store instructions, in some embodiments. The processor detects if a conflict occurs in updating the memory mapped file at block 312. For example, if two threads attempt to modify the same file at the same time, then a conflict occurs. It is to be understood that the two threads do not need to start or end at the same time for a conflict to occur, but rather the separate attempts to update the same memory mapped file through hardware transactional memory can merely overlap in time.

If a conflict is detected at block 312, the processor performs a conflict process at block 314. The conflict process can include, in some embodiments, permitting a transaction associated with a first thread to complete and commit the changes to the memory mapped file while failing the transaction associated with the other thread and restarting the transaction the transaction associated with the other thread at block 310. In other embodiments, each of the conflicting threads fails and restarts at block 310. Restarting the different threads can be staggered to reduce the likelihood that they continue to concurrently attempt to modify the same file through hardware transactional memory. One example conflict process is discussed in more detail below with respect to FIG. 4. If no conflict is detected at block 312, the processor commits the change to the memory mapped file and updates the primary file, such as through write-back as discussed above, at block 316. The transaction then ends at block 318.

Figure 4:
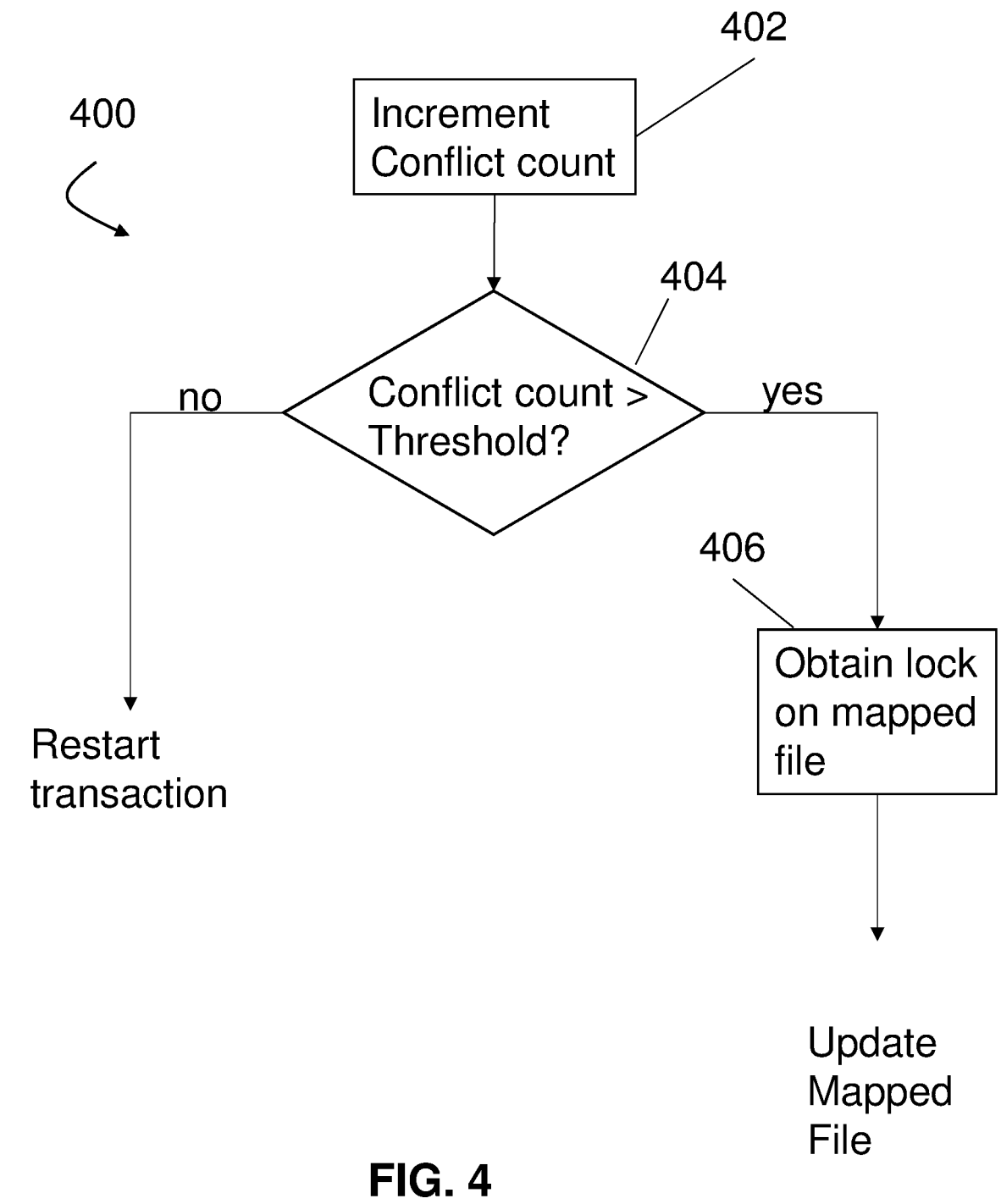
FIG. 4 is a flow chart depicting one embodiment of an example method of processing a detected conflict.

FIG. 4 is a flow chart depicting one embodiment of an example method 400 of processing a detected conflict. Method 400 can be implemented as part of block 314 in method 300. Method 400 can be implemented by a processor executing instructions such as CPU 105 executing file access instructions 110 discussed above. It is to be understood that the order of actions in example method 400 is provided for purposes of explanation and that the method 400 can be performed in a different order in other embodiments. Similarly, it is to be understood that some actions can be omitted or additional actions can be included in other embodiments.

At block 402, a conflict count is incremented. The conflict count is a variable indicating the number of times that a conflict has been detected for the currently executing transaction. At block 404, it is determined if the incremented conflict count exceeds a threshold. The threshold represents a maximum limit of the number of times a transaction should be restarted. If the threshold is not exceeded at block 404, then the method 400 returns to block 310 of FIG. 3 where the transaction is restarted. If the threshold is exceeded at block 404, then use of transactional memory is stopped and the processor uses a fallback technique for obtaining a lock on the file at block 406. For example, in some embodiments, the processor obtains a spin-lock on the file using conventional techniques. Notably, unlike conventional hardware transactional techniques, the embodiments described herein do not need to obtain a speculative lock when performing the updates using transactional memory and, thus, avoids the overhead associated with such a speculative lock. Rather, after reaching a predetermined number of fail attempts, the processor initiates a process for obtaining a lock. After obtaining the lock at block 406, the method returns to FIG. 3 where the MMapped file is updated and the changes are committed to the primary file.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A computer-implemented method comprising:
   receiving a request to write to a file; in response to the request to write to the file, determining that the file exists in a storage device;
   in response to the determination that the file exists in the storage device, creating a mapped file by mapping the file into a region of a non-volatile dual in-line memory module (NVDIMM);
   initiating a transaction to write to the mapped file in the NVDIMM without acquiring a speculative lock on the mapped file;
   determining whether a conflict occurred in writing to the mapped file in the NVDIMM;
   in response to a determination that a conflict occurred, restarting the transaction to write to the mapped file in the NVDIMM without acquiring the speculative lock on the mapped file, wherein the determination that the conflict occurred includes a conflict between a transaction associated with a first thread and a transaction associated with a second thread, wherein restarting the transaction to write to the mapped file comprises:
      restarting the transaction associated with the first thread; and restarting the transaction associated with the second thread; wherein restarting the transaction associated with the first thread and restarting the transaction associated with the second thread are done in a staggered manner; and
   in response to a determination that no conflict occurred, committing changes made to the mapped file to the file in the storage device.

2. The computer-implemented method of claim 1, wherein mapping the file into a region of the NVDIMM includes mapping the file into a virtual dynamic shared object (vDSO).

3. The computer-implemented method of claim 1, wherein the determination that the conflict occurred includes a conflict between a transaction associated with a first thread and a transaction associated with a second thread, wherein restarting the transaction to write to the mapped file comprises:
   completing the transaction associated with the first thread; and
   restarting the transaction associated with the second thread.

4. The computer-implemented method of claim 1, wherein mapping the file into the region of the NVDIMM includes the mapping the file into the region of the NVDIMM using a write-back mode.

5. The computer-implemented method of claim 1, wherein restarting the transaction to write to the mapped file comprises obtaining a lock on the mapped file after a predetermined number of failed transactions to write to the mapped file are detected.

6. The computer-implemented method of claim 5, wherein obtaining the lock on the mapped file comprises obtaining a spin-lock on the mapped file.

7. A computer system comprising: a storage device configured to store a plurality of files;
a non-volatile dual in-line memory module (NVDIMM); and
a processor communicatively coupled to the storage device and to the NVDIMM, wherein the processor is configured to: memory map at least one file from the plurality of files stored on the storage device into a region of the NVDIMM to at least one memory mapped file;
initiate a transaction to write to the at least one memory mapped file in the NVDIMM without acquiring a speculative lock on the at least one memory mapped file;
determine whether a conflict occurred in writing to the at least one memory mapped file in the NVDIMM;
in response to a determination that the conflict occurred, restart the transaction to write to the at least one memory mapped file in the NVDIMM without acquiring the speculative lock on the at least one memory mapped file, wherein the determination that the conflict occurred includes a conflict between a transaction associated with a first thread and a transaction associated with a second thread, wherein restarting the transaction to write to the at least one memory mapped file comprises:
restarting the transaction associated with the first thread; and restarting the transaction associated with the second thread; wherein restarting the transaction associated with the first thread and restarting the transaction associated with the second thread are done in a staggered manner; and
in response to a determination that no conflict occurred, commit changes made to the at least one memory mapped file to the corresponding at least one file in the storage device.

8. The computer system of claim 7, wherein the processor is configured to map the at least one file into a virtual dynamic shared object (vDSO) in the NVDIMM.

9. The computer system of claim 7, wherein in response to determining that the conflict occurred between a transaction associated with a first thread and a transaction associated with a second thread, the processor is configured to:
complete the transaction associated with the first thread; and
restart the transaction associated with the second thread.

10. The computer system of claim 7, wherein the processor is configured to memory map the at least one file into the region of the NVDIMM in a write-back mode.

11. The computer system of claim 7, wherein the processor is configured to obtain a lock on the at least one memory mapped file after a predetermined number of failed transactions to write to the at least one memory mapped file are detected.

12. The computer system of claim 11, wherein the lock is a spin-lock.

13. A computer program product comprising a non-transitory computer readable storage medium having a computer readable program stored therein, wherein the computer readable program, when executed by a processor, causes the processor to: memory map a file stored on the storage device into a region of the NVDIMM that is a memory mapped file;
initiate a transaction to write to the memory mapped file in the NVDIMM without acquiring a speculative lock on the memory mapped file;
determine whether a conflict occurred in writing to the memory mapped file in the NVDIMM;
in response to a determination that the conflict occurred, restart the transaction to write to the memory mapped file in the NVDIMM without acquiring the speculative lock on the memory mapped file, wherein the determination that the conflict occurred includes a conflict between a transaction associated with a first thread and a transaction associated with a second thread, wherein restarting the transaction to write to the memory mapped file comprises:
restarting the transaction associated with the first thread; and restarting the transaction associated with the second thread; wherein restarting the transaction associated with the first thread and restarting the transaction associated with the second thread are done in a staggered manner; and
in response to a determination that no conflict occurred, commit changes made to the memory mapped file to the file stored on the storage device.

14. The computer program product of claim 13, wherein the computer readable program is further configured to cause the processor to map the file into a virtual dynamic shared object (vDSO) in the NVDIMM.

15. The computer program product of claim 13, wherein, in response to a determination that a conflict occurred between a transaction associated with a first thread and a transaction associated with a second thread, the computer readable program is further configured to cause the processor to:
complete the transaction associated with the first thread; and
restart the transaction associated with the second thread.

16. The computer program product of claim 13, wherein the computer readable program is further configured to cause the processor to memory map the file into the region of the NVDIMM in a write-back mode.

17. The computer program product of claim 13, wherein the computer readable program is further configured to cause the processor to obtain a lock on the memory mapped file after a predetermined number of failed transactions to write to the memory mapped file are detected.

* * * * *